(12) United States Patent
Im et al.

(10) Patent No.: US 10,894,843 B2
(45) Date of Patent: Jan. 19, 2021

(54) OLEFIN POLYMER, PREPARATION METHOD OF THE SAME, AND FILM USING THE SAME

(71) Applicant: LG Chem, Ltd., Seoul (KR)

(72) Inventors: Seul Ki Im, Daejeon (KR); Seungmi Lee, Daejeon (KR); Ohjoo Kwon, Daejeon (KR); Eunji Shin, Daejeon (KR); Ki Soo Lee, Daejeon (KR); Daesik Hong, Daejeon (KR); Sung Ho Park, Daejeon (KR); Youngsuk You, Daejeon (KR); Jinyoung Lee, Daejeon (KR)

(73) Assignee: LG Chem, Ltd.

( * ) Notice: Subject to any disclaimer, the term of this patent is extended or adjusted under 35 U.S.C. 154(b) by 20 days.

(21) Appl. No.: 16/478,692

(22) PCT Filed: Nov. 29, 2018

(86) PCT No.: PCT/KR2018/014973
§ 371 (c)(1),
(2) Date: Jul. 17, 2019

(87) PCT Pub. No.: WO2019/124805
PCT Pub. Date: Jun. 27, 2019

(65) Prior Publication Data
US 2020/0115475 A1    Apr. 16, 2020

(30) Foreign Application Priority Data

Dec. 18, 2017 (KR) .......................... 10-2017-0174517
Nov. 27, 2018 (KR) .......................... 10-2018-0148557

(51) Int. Cl.
*C08F 110/02* (2006.01)
*C08F 10/02* (2006.01)
(Continued)

(52) U.S. Cl.
CPC ............ *C08F 10/04* (2013.01); *C08F 4/6465* (2013.01); *C08F 4/6592* (2013.01);
(Continued)

(58) Field of Classification Search
CPC ...... C08F 10/02; C08F 110/02; C08F 210/16; C08F 2500/10
See application file for complete search history.

(56) References Cited

U.S. PATENT DOCUMENTS 7,122,691 B2 * 10/2006 Oshima .................. C07F 5/066
556/187
7,220,805 B2 * 5/2007 Takaoki ............... B01J 31/0244
502/113

(Continued)

FOREIGN PATENT DOCUMENTS

EP          3168243 A1      5/2017
JP          2006-2098    *   1/2006
(Continued)

OTHER PUBLICATIONS

Supplemental European Search Report including Written opinion for EP18891719 dated Jan. 2, 2020.
(Continued)

*Primary Examiner* — Rip A Lee
(74) *Attorney, Agent, or Firm* — Lerner, David, Littenberg, Krumholz & Mentlik, LLP (57) ABSTRACT

An olefin polymer capable of simultaneously satisfying excellent drop impact strength and transparency, a preparation method of the same, and a film using the same, can be provided. In an embodiment, an olefin polymer comprises a plurality of polymer chains, and satisfies the following conditions: i) each polymer chain of the plurality having an average number of short chain branches (SCBs) per 1000 carbon atoms of 20/1000C or more, wherein an SCB has C2
(Continued)

to C7 carbon atoms, ii) a molded film of the olefin polymer having a drop impact strength of 1500 g to 2400 g as measured in accordance with ASTM D1709A, wherein the molded film having a thickness of 100 μm, and iii) a molded film of the olefin polymer having a haze is 10% to 30% as measured in accordance with ASTM D1003, wherein the molded film having a thickness of 0.05 mm.

15 Claims, 2 Drawing Sheets (51) Int. Cl.
  C08F 210/16 (2006.01)
  C08F 10/04 (2006.01)
  C08F 4/646 (2006.01)
  C08F 4/659 (2006.01)
  C08F 4/6592 (2006.01)
  C08F 10/14 (2006.01)
  C08J 5/18 (2006.01)
(52) U.S. Cl.
  CPC .......... C08F 4/65916 (2013.01); C08F 10/02 (2013.01); C08F 10/14 (2013.01); C08F 110/02 (2013.01); C08J 5/18 (2013.01); C08F 2500/10 (2013.01); C08J 2323/04 (2013.01); C08J 2323/10 (2013.01); C08J 2323/20 (2013.01)

(56) References Cited

U.S. PATENT DOCUMENTS

| | | | |
|---|---|---|---|
| 7,524,789 B2* | 4/2009 | Oshima | C08F 10/00 502/103 |
| 8,084,559 B2* | 12/2011 | Senda | B01J 31/2295 526/160 |
| 9,732,171 B2* | 8/2017 | Sung | C08F 210/16 |
| 9,963,529 B1* | 5/2018 | Kazemi | B01J 19/0066 |
| 10,334,102 B2* | 6/2019 | Jung | H04M 3/42246 |
| 10,344,102 B2* | 7/2019 | Kim | C08F 4/65904 |
| 2011/0177313 A1 | 7/2011 | Chai et al. | |
| 2011/0212283 A1 | 9/2011 | Fantinel et al. | |
| 2011/0212315 A1 | 9/2011 | Fantinel et al. | |
| 2011/0217537 A1 | 9/2011 | Fantinel et al. | |
| 2011/0223406 A1 | 9/2011 | Fantinel et al. | |
| 2012/0289665 A1 | 11/2012 | Chai et al. | |
| 2014/0316096 A1* | 10/2014 | Berbee | C09D 123/0815 526/352.2 |
| 2016/0222144 A1 | 8/2016 | Kum et al. | |
| 2016/0369020 A1 | 12/2016 | Sung et al. | |
| 2017/0081437 A1* | 3/2017 | Lernoux | C08F 210/16 |
| 2017/0129230 A1* | 5/2017 | Wang | B32B 27/32 |
| 2018/0223009 A1* | 8/2018 | Kim | B01J 27/24 |
| 2018/0305475 A1* | 10/2018 | Berbee | C08F 10/02 |
| 2018/0305476 A1* | 10/2018 | Berbee | B01J 19/1812 |
| 2018/0305532 A1* | 10/2018 | Zhang | C08L 23/0815 |
| 2019/0135963 A1* | 5/2019 | Kim | C08F 210/16 |
| 2019/0225721 A1* | 7/2019 | Cho | C08L 23/0815 |
| 2020/0199265 A1* | 6/2020 | Small | C08F 110/02 |

FOREIGN PATENT DOCUMENTS

| | | |
|---|---|---|
| JP | 2006002098 A | 1/2006 |
| JP | 2012505303 A | 3/2012 |
| JP | 2013517363 A | 5/2013 |
| JP | 20160067509 A | 6/2016 |
| JP | 2016536442 A | 11/2016 |
| JP | 2017526773 A | 9/2017 |
| KR | 20100025074 A | 3/2010 |
| KR | 20100102854 A | 9/2010 |
| KR | 20110061584 A | 6/2011 |
| KR | 20110063488 A | 6/2011 |
| KR | 20110063489 A | 6/2011 |
| KR | 20150058105 A | 5/2015 |
| KR | 20150063823 A | 6/2015 |
| KR | 20160067508 A | 6/2016 |
| KR | 20170076550 A | 7/2017 |
| WO | 2010034464 A1 | 4/2010 |

OTHER PUBLICATIONS

International Search Report including the Written Opinion from Application No. PCT/KR2018/014973 dated Mar. 11, 2019, 8 pages.

* cited by examiner

ion No. PCT/KR2018/
OLEFIN POLYMER, PREPARATION METHOD OF THE SAME, AND FILM USING THE SAME

CROSS-REFERENCE TO RELATED APPLICATIONS

The present application is a national phase entry under 35 U.S.C. § 371 of International Applicat014973, filed on Nov. 29, 2018, which claims priority from Korean Patent Application No. 10-2017-0174517, filed on Dec. 18, 2017, and No. 10-2018-0148557, filed on Nov. 27, 2018, the disclosures of which are incorporated herein by reference.

TECHNICAL FIELD

The present disclosure relates to an olefin polymer, a preparation method of the same, and a film using the same.

BACKGROUND OF ART

Olefin polymerization catalyst systems may be divided into Ziegler-Natta and metallocene catalyst systems, and these highly active catalyst systems have been developed in accordance with their characteristics. The Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and uniform compositional distribution of comonomers, due to the single site characteristic.

However, a polymer polymerized by using a metallocene catalyst has a narrow molecular weight distribution, and therefore, when applied to some products, there is a problem that productivity is lowered due to an influence of extrusion loads and the like.

To solve this problem, a method of controlling the molecular weight distribution of the polymer by supporting two different types of metallocene catalyst precursors together with an activating agent on a support and then polymerizing using the same has been proposed.

However, existing catalysts have difficulty in simultaneously realizing characteristics of the two types of catalysts, and there is a limit in increasing drop impact strength and transparency, which are important physical properties of a film to which the synthesized polymer is applied.

Therefore, there is a demand for developing a novel polymer in which the synthesized polymer can simultaneously satisfy excellent drop impact strength and transparency while using two types of metallocene catalyst precursors.

Advantageous Effects

The present disclosure provides an olefin polymer capable of simultaneously satisfying excellent drop impact strength and transparency, a preparation method of the same, and a film using the same.

DETAILED DESCRIPTION OF THE INVENTION

The present disclosure is to provide an olefin polymer capable of simultaneously satisfying excellent drop impact strength and transparency.

The present disclosure is also to provide a preparation method of the olefin polymer.

In addition, the present disclosure is to provide a film including the olefin polymer.

Technical Solution

According to one embodiment of the present disclosure, an olefin polymer satisfying the following conditions of i) to iii) is provided:

i) an average number of C2 to C7 branches per 1000 carbon atoms (measured by FT-IR) contained in each of a plurality of polymer chains in the olefin polymer is 20/1000C or more, ii) a drop impact strength is 1500 g to 2400 g, when molded into a film having a thickness of 100 μm and measured in accordance with ASTM D1709A, and iii) haze is 10% to 30%, when molded into a film having a thickness of 0.05 mm and measured in accordance with ASTM D1003.

Specifically, the olefin polymer of one embodiment has an average number of C2 to C7 branches per 1000 carbon atoms (measured by FT-IR) contained in each of a plurality of polymer chains in the olefin polymer of 20/1000C or more, specifically, 20/1000C to 50/1000C, 20/1000C to 40/1000C, 20/1000C to 30/1000C, 20/1000C to 22/1000C, 20.1/1000C to 50/1000C, 20.3/1000C to 50/1000C, 20.5/1000C to 50/1000C, 20.1/1000C to 40/1000C, 20.3/1000C to 40/1000C, 20.5/1000C to 40/1000C, 20.1/1000C to 30/1000C, 20.3/1000C to 30/1000C, 20.5/1000C to 30/1000C, or 20.5/1000C to 21.7/1000C.

As a result, it is possible to synthesize an olefin polymer capable of simultaneously satisfying improvement in drop impact strength and reduction in haze, which are difficult to realize in conventional metallocene films, and it is also possible to produce an olefin polymer having excellent molecular weight, molecular weight distribution, melt index, and density characteristics.

In particular, the olefin polymer of the embodiment has a structure in which a comonomer such as an alpha-olefin is incorporated predominantly in main chains with high molecular weight. That is, the olefin polymer has a broad orthogonal comonomer distribution (BOCD) structure in which the content of short chain branches (SCB) increases as the molecular weight increases. Therefore, as the SCB content of the polymer chain with high molecular weight becomes relatively high, the average number of C2 to C7 branches (SCB) per 1000 carbon atoms (measured by FT-IR) contained in each of a plurality of polymer chains in the olefin polymer can be increased to 20/1000C or more.

This distinctive structure of the olefin polymer appears to be due to the combined use of two metallocene catalyst precursors having specific structures used in the preparation method of an olefin polymer of another embodiment described later.

In addition, as the average number of C2 to C7 branches per 1000 carbon atoms (measured by FT-IR) contained in each of a plurality of polymer chains in the olefin polymer is increased to 20/1000C or more, tie molecules such as short chain branches (SCB) are incorporated predominantly in a high molecular weight region, relatively related to physical properties rather than a low molecular weight region, thereby realizing better physical properties than the conventional polymers.

For example, a drop impact strength is as high as 1500 g to 2400 g, when the olefin polymer of the embodiment is molded into a film having a thickness of 100 μm and measured in accordance with ASTM D1709A, and haze is as low as 10% to 30%, when molded into a film having a thickness of 0.05 mm and measured in accordance with ASTM D1003.

It was confirmed through experiments that when the average number of C2 to C7 branches per 1000 carbon atoms (measured by FT-IR) contained in each of a plurality of polymer chains in the olefin polymer is less than 20/1000C, drop impact strength was reduced to about 1100 g or less, which is less than 1500 g, when the olefin polymer of the embodiment was molded into a film having a thickness of 100 μm and measured in accordance with ASTM D1709A, and this invention was completed.

Therefore, the olefin polymer of the embodiment can improve the drop impact strength and transparency, which are important physical properties of a film to which the synthesized polymer is applied, to be equal to or higher than that of the prior art. Accordingly, it is possible to realize stable durability from excellent mechanical strength in the process of manufacturing, storing, and transporting the film, and securing transparency at the same time, so that excellent optical characteristics can be realized in the product to which the film is applied.

In the present disclosure, when a part "comprises or includes" a component, the part does not exclude other components, but may comprise or include other components unless context states otherwise.

In the present disclosure, an alkyl group is a monovalent functional group derived from an alkane, and may be linear, branched, or cyclic. Examples thereof include methyl, ethyl, propyl, iso-butyl, sec-butyl, tert-butyl, pentyl, hexyl, and the like. At least one hydrogen atom contained in the alkyl group may be substituted with another substituent. Examples of the substituent include a C1 to C10 alkyl group, a C2 to C10 alkenyl group, a C2 to C10 alkynyl group, a C6 to C12 aryl group, a C2 to C12 heteroaryl group, a C6 to C12 arylalkyl group, a halogen atom, a cyano group, an amino group, an amidino group, a nitro group, an amide group, a carbonyl group, a hydroxyl group, a sulfonyl group, a carbamate group, a C1 to C10 alkoxy group, and the like.

In the present disclosure, the term "substituted" means that another functional group is bonded in place of a hydrogen atom of the compound, and the position to be substituted is not limited as long as it is a position at which the hydrogen atom can be substituted, that is, a position at which the substituent is substitutable. When two or more are substituted, the two or more substituents may be the same or different.

In the present disclosure, the aryl group is not particularly limited, but preferably has 6 to 60 carbon atoms, and may be a monocyclic aryl group or a polycyclic aryl group. According to one embodiment, the aryl group has 6 to 30 carbon atoms. According to one embodiment, the aryl group has 6 to 20 carbon atoms. The aryl group may be a phenyl group, a biphenyl group, a terphenyl group, or the like as the monocyclic aryl group, but is not limited thereto. Examples of the polycyclic aryl group include, but are not limited to, a naphthyl group, an anthracenyl group, a phenanthryl group, a pyrenyl group, a perylenyl group, a chrysenyl group, a fluorenyl group, and the like.

In the present disclosure, the alkoxy group may be linear, branched, or cyclic. The number of carbon atoms of the alkoxy group is not particularly limited, but is preferably 1 to 30 carbon atoms. Specific examples include methoxy, ethoxy, n-propoxy, iso-propoxy, i-propyloxy, n-butoxy, iso-butoxy, tert-butoxy, sec-butoxy, n-pentyloxy, neo-pentyloxy, iso-pentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but the present disclosure is not limited thereto.

In the present disclosure, the alkoxyalkyl group may be a functional group substituted with an alkoxy group for the above-mentioned alkyl group. The number of carbon atoms of the alkoxyalkyl group is not particularly limited, but is preferably 1 to 20 carbon atoms. Specifically, it may be tert-butoxyhexyl or the like, but is not limited thereto.

In the present disclosure, examples of a halogen group include fluorine, chlorine, bromine, and iodine.

In the present disclosure, or means a bond connected to another substituent group.

In the present disclosure, the term "olefin polymer" refers to an ethylene homopolymer, or a copolymer of ethylene or propylene and an alpha-olefin, where the copolymer includes a plurality of blocks or segments of repeating units that are distinguishable from one another in terms of at least one physical or chemical property such as, for example, the content (mole fraction) of the repeating unit derived from the ethylene or propylene and the alpha-olefin, the degree of crystallization, density, or melting temperature.

In addition, the term "polymer chain(s)" included in the "olefin polymer" refers to a plurality of polymer chains formed by polymerization and preparation of the olefin polymer. The molecular weight of the polymer chains can be determined from a molecular weight distribution curve elicited by using gel permeation chromatography (GPC). Further, the distribution of the branches contained in the polymer chain can be determined through an FT-IR analysis of the olefin polymer. The content of the polymer chains can be calculated by a 1H-NMR analysis. These polymer chains can be defined as "polymer chain(s)" contained in the "olefin polymer".

The term "maximum peak molecular weight (Mp)" of the "olefin polymer" refers to a molecular weight of the polymer chains included in the olefin polymer at the highest content, when the "polymer chain(s)" in the olefin polymer are arranged in value order of the molecular weight from lowest to highest. The "maximum peak molecular weight (Mp)" can be determined from a molecular weight distribution curve of the olefin polymer elicited by using gel permeation chromatography (GPC). In the molecular weight distribution curve, for example, the x-axis represents the molecular weight of each polymer chain or its log value, and the y-axis is defined as a function of the content of the polymer chain. The molecular weight x at the point where y is at the maximum in the distribution curve (i.e., the molecular weight x at the vertex of the distribution curve) is referred to as "the maximum peak molecular weight (Mp)".

The term "short chain branch (SCB)" in the "olefin polymer" refers to a chain branching from the longest main chain in each of the polymer chain(s). The number of the short chain branches (SCBs) can be determined from the FT-IR analysis of the olefin polymer.

Specifically, the olefin polymer of the embodiment can satisfy the following conditions of i) to iii):

i) the average number of C2 to C7 branches per 1000 carbon atoms (measured by FT-IR) contained in each of a plurality of polymer chains in the olefin polymer is 20/1000C or more, ii) a drop impact strength is 1500 g to 2400 g, when molded into a film having a thickness of 100 μm and measured in accordance with ASTM D1709A, and iii) a haze is 10% to 30%, when molded into a film having a thickness of 0.05 mm and measured in accordance with ASTM D1003.

First, the olefin polymer may have the average number of C2 to C7 branches per 1000 carbon atoms (measured by FT-IR) contained in each of a plurality of polymer chains in the olefin polymer of 20/1000C or more.

The term "polymer chain(s)" included in the "olefin polymer" refers to a plurality of polymer chains formed by polymerization and preparation of the olefin polymer. The molecular weight of the polymer chains can be determined from a molecular weight distribution curve elicited by using gel permeation chromatography (GPC).

The gel permeation chromatography may be carried out, for example, using a Polymer Laboratories PLgel MIX-B with a 300 mm long column and a PL-GPC220 instrument manufactured by Waters, at an evaluation temperature of 100° C. to 200° C. 1,2,4-trichlorobenzene may be used for a solvent, and a flow rate may be 0.1 mL/min to 10 mL/min. A sample with a concentration of 1 mg/10 mL to 20 mg/10 mL may be supplied in an amount of 100 μL to 300 μL.

The average number of C2 to C7 branches per 1000 carbon atoms contained in each of a plurality of polymer chains in the olefin polymer can be confirmed by analyzing the olefin polymer by FT-IR.

For example, the FT-IR may be performed using a Bio-Rad FTS 3000 with a Golden Gate Single Reflection ATR system equipped with a DTGS detector at an evaluation temperature of 100° C. to 200° C., a wavenumber of 2000 $cm^{-1}$ to 4000 $cm^{-1}$, a number of scans of 1 to 20, and a resolution of 1 $cm^{-1}$ to 10 $cm^{-1}$.

The average number of C2 to C7 branches per 1000 carbon atoms contained in each of a plurality of polymer chains in the olefin polymer can be calculated by dividing the total number of C2 to C7 branches per 1000 carbon atoms contained in each of a plurality of polymer chains in the olefin polymer by the number of the polymer chains.

The average number of C2 to C7 branches per 1000 carbon atoms contained in each of a plurality of polymer chains in the olefin polymer can be measured by obtaining an SCB distribution curve by plotting log values of molecular weights M measured by GPC (log M) on the x-axis and the number of C2 to C7 branches per 1000 carbon atoms measured by FT-IR with respect to the log value on the y-axis, and calculating by the method described above.

That is, for all the polymer chains having various molecular weights measured by gel permeation chromatography (GPC), the olefin polymer may have an average number of C2 to C7 branches per 1000 carbon atoms contained in each of polymer chains of as high as 20/1000C or more, specifically, 20/1000C to 50/1000C, 20/1000C to 40/1000C, 20/1000C to 30/1000C, 20/1000C to 22/1000C, 20.1/1000C to 50/1000C, 20.3/1000C to 50/1000C, 20.5/1000C to 50/1000C, 20.1/1000C to 40/1000C, 20.3/1000C to 40/1000C, 20.5/1000C to 40/1000C, 20.1/1000C to 30/1000C, 20.3/1000C to 30/1000C, 20.5/1000C to 30/1000C, or 20.5/1000C to 21.7/1000C.

In addition, as the average number of C2 to C7 branches per 1000 carbon atoms (measured by FT-IR) contained in each of a plurality of polymer chains in the olefin polymer is increased to 20/1000C or more, tie molecules such as short chain branches (SCB) are incorporated predominantly in a high molecular weight region, relatively related to physical properties rather than a low molecular weight region, thereby realizing better physical properties than the conventional polymers.

When the average number of C2 to C7 branches per 1000 carbon atoms (measured by FT-IR) contained in each of a plurality of polymer chains in the olefin polymer is less than 20/1000C, drop impact strength is reduced to about 1100 g or less, which is less than 1500 g, when the olefin polymer of the embodiment is molded into a film having a thickness of 100 μm and measured in accordance with ASTM D1709A.

Figure 1:
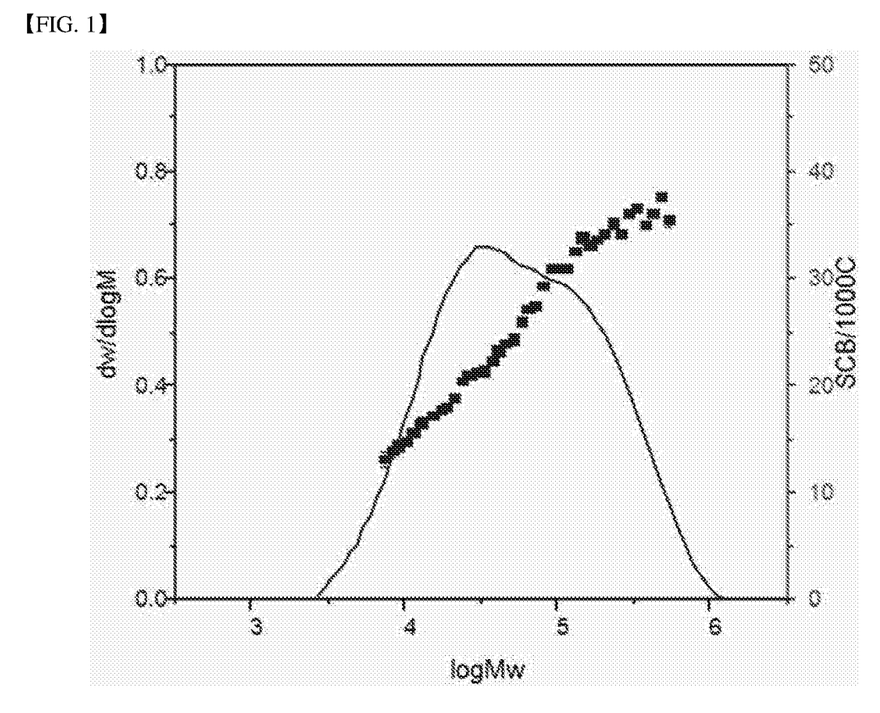
FIG. 1 shows a molecular weight distribution curve (solid line) and a SCB distribution curve (dotted line) of the olefin polymer of Example 1.

As shown in a SCB distribution curve of FIG. 1 obtained by plotting log values of molecular weights M measured by GPC (log M) on the x-axis and the number of C2 to C7 branches per 1000 carbon atoms measured by FT-IR with respect to the log values on the y-axis, the olefin polymer in the embodiment tends to increase the number of C2 to C7 branches per 1000 carbon atoms as the molecular weight increases to more than the maximum peak molecular weight.

Accordingly, in an SCB distribution curve obtained by plotting log values of molecular weights M measured by GPC (log M) on the x-axis and the number of C2 to C7 branches per 1000 carbon atoms measured by FT-IR with respect to the log values on the y-axis, when a point on the x-axis corresponding to log values of weight average molecular weights is defined as 0.5, a point on the x-axis corresponding to a log value of a minimum molecular weight is defined as 0, and a point on the x-axis corresponding to a log value of a maximum molecular weight is defined as 1, the number of C2 to C7 branches per 1000 carbon atoms may have a maximum value in a range of 0.8 to 1.0 on the x-axis.

On the other hand, as shown in FIG. 1, the olefin polymer of the embodiment tends to decrease the number of C2 to C7 branches per 1000 carbon atoms as the molecular weight decreases to less than the maximum peak molecular weight.

Accordingly, in an SCB distribution curve obtained by plotting log values of molecular weights M measured by GPC (log M) on the x-axis and the number of C2 to C7 branches per 1000 carbon atoms measured by FT-IR with respect to the log value on the y-axis, when a point on the x-axis corresponding to log values of weight average molecular weights is defined as 0.5, a point on the x-axis corresponding to a log value of a minimum molecular weight is defined as 0, and a point on the x-axis corresponding to a log value of a maximum molecular weight is defined as 1, the number of C2 to C7 branches per 1000 carbon atoms may have a minimum value in a range of 0 to 0.2 on the x-axis.

In addition, the olefin polymer may have drop impact strength of 1500 g to 2400 g, 1550 g to 2200 g, 1580 g to 2000 g, or 1590 g to 1700 g, when molded into a film having a thickness of 100 m, more specifically a size of 5 cm×5 cm×100 m (width×length×thickness), and measured in accordance with ASTM D1709A. When the drop impact strength of the olefin polymer is excessively decreased to less than 1500 g, it is difficult to obtain sufficient strength to apply the olefin polymer to a film. Therefore, the film has poor durability such as damage or breakage of the film during manufacture, storage, transportation, or application of the film.

Further, the olefin polymer may have haze of 10% to 30%, 15% to 30%, 20% to 30%, 25% to 30%, or 26.3% to 27.8%, when molded into a film having a thickness of 0.05 mm and measured in accordance with ASTM D1003. When the haze of the olefin polymer is excessively increased to more than 30%, it is difficult to achieve sufficient transparency when applied to a film, and it is difficult to satisfy optical characteristics required for products to which the film is applied.

The olefin polymer may have a molecular weight distribution (MWD=Mw/Mn) of 5 to 10, 7 to 10, 8.5 to 10, or 8.9 to 9.6. As the molecular weight distribution of the olefin polymer is broad as described above, processability of the olefin polymer can be improved. When the molecular weight distribution of the olefin polymer decreases to less than 5 or increases to more than 10, it is difficult to secure optimum processability for applying the olefin polymer to a film, and thus the manufacturing efficiency of the film may be deteriorated and it is difficult to realize high strength.

In addition, the olefin polymer may have a melt index (measured at 230° C. with a load of 2.16 kg in accordance with ASTM D1238) of 0.80 g/10 min to 0.93 g/10 min, or 0.85 g/10 min to 0.93 g/10 min. The melt index can be adjusted according to the amount of hydrogen introduced during the polymerization process. The olefin polymer of the present disclosure has the MI within the above range, so that it can simultaneously improve strength as well as molding-processability to a film or the like.

Particularly, when the melt index is excessively decreased in the film-forming process using the olefin polymer, a processing pressure may rise and thus processability may be deteriorated. When it is excessively increased, it is difficult to realize high strength.

Further, the olefin polymer may have a density (ASTM 1505) of 0.910 g/cm³ to 0.930 g/cm³. The olefin polymer may have a weight average molecular weight (measured by GPC) of 100,000 g/mol to 150,000 g/mol. When the weight average molecular weight (measured by GPC) of the olefin polymer is excessively increased, it may be difficult to realize stable molding-processability in the production of a film due to an increase in molecular weight.

On the other hand, as described above, the olefin polymer of the embodiment can be prepared by a preparation method of the olefin polymer which will be described later.

According to another embodiment of the present disclosure, a preparation method including the step of polymerizing olefinic monomers in the presence of a supported hybrid catalyst including a first transition metal compound represented by the following Chemical Formula 1, a second transition metal compound represented by the following Chemical Formula 2, and a support on which the first and second transition metal compounds are supported, is provided:

[Chemical Formula 1]

[Chemical Formula 2]

wherein, in Chemical Formulae 1 and 2,

C₁ is a ligand represented by the following Chemical Formula 3,

[Chemical Formula 3]

where R₁ and R₂ are the same as or different from each other, and at least one of R₁ and R₂ is a C1 to C20 alkyl group and the other is hydrogen;

Z is —O—, —S—, —NR₃—, or —PR₄—, where R₃ and R₄ are the same as or different from each other, and are each independently a halogen or a C1 to C20 alkyl group;

M₁ and M₂ are the same as or different from each other, and are each independently Ti, Zr, or Hf;

X₁ to X₄ are the same as or different from each other, and are each independently a halogen;

T is where T₁ is C, Si, Ge, Sn, or Pb,

Y₁ is a C1 to C20 alkoxyalkyl group, and

Y₂ is a C1 to C20 alkyl group;

Cp₁ and Cp₂ are cyclopentadienyl groups;

R₇ and R₈ are the same as or different from each other, and are each independently a halogen or a C1 to C20 alkyl group; and u and v are each independently an integer of 0 to 5.

The first transition metal compound represented by Chemical Formula 1 includes an indene compound having a substituent group and a base compound containing a Group 14 or Group 15 atom as different ligands. The different ligands are cross-linked by -T- and have a structure in which M₁(X₁)(X₂) exists between them. The first transition metal compound with the specific structure has excellent support stability, exhibits high activity in olefin polymerization, and can provide an olefin polymer having a high molecular weight.

Specifically, the $C_1$ ligand in the structure of the first transition metal compound represented by Chemical Formula 1 may affect, for example, polymerization activity and copolymerization properties of the olefin.

In particular, the first transition metal compound of Chemical Formula 1 including the ligand of Chemical Formula 3 as the $C_1$ ligand can provide a catalyst exhibiting very high activity and high conversion to a comonomer in the olefin polymerization process.

In the structure of the first transition metal compound represented by Chemical Formula 1, the Z ligand may affect, for example, polymerization activity of the olefin.

In particular, when Z of the Chemical Formula 1 is —$NR_3$— and $R_3$ is a C1 to C10 alkyl group, specifically a tert-butyl group, it is possible to provide a catalyst exhibiting very high activity in olefin polymerization.

The $C_1$ ligand and the Z ligand are cross-linked by -T- to exhibit excellent support stability. For achieving this effect, -T- may have a structure wherein $T_1$ is C or Si, $Y_1$ is a C1 to C20 alkoxyalkyl group, preferably a tert-butoxy-hexyl group, and $Y_2$ is a C1 to C20 alkyl group, preferably a methyl group.

Meanwhile, $M_1(X_1)(X_2)$ exists between the cross-linked ligands, and this may affect storage stability of metal complexes.

In order to more effectively ensure this effect, transition metal compounds in which $X_1$ and $X_2$ are each independently any one of halogens can be used.

The first transition metal compound represented by Chemical Formula 1 can be synthesized by applying known reactions, and a more detailed synthesis method can be referred to in the following examples.

Specifically, the first transition metal compound may be a compound represented by the following Chemical Formula 4:

[Chemical Formula 4]

wherein, in Chemical Formula 4, $R_1$ and $R_2$ are the same as or different from each other, and at least one of $R_1$ and $R_2$ is a C1 to C20 alkyl group and the other is hydrogen, $R_3$ is a C1 to C10 alkyl group, $M_1$ is Ti, Zr, or Hf, $X_1$ and $X_2$ are the same as or different from each other, and are each independently a halogen,

$T_1$ is C or Si, $Y_1$ is a C1 to C20 alkoxyalkyl group, and

$Y_2$ is a C1 to C20 alkyl group.

More specifically, examples of the compound represented by Chemical Formula 4 include compounds represented by the following Chemical Formulae 4-1 to 4-3.

[Chemical Formula 4-1]

[Chemical Formula 4-2]

[Chemical Formula 4-3]

Meanwhile, unlike the first transition metal compound, when the second transition metal compound represented by Chemical Formula 2 is activated by an appropriate method to be used as a catalyst for the olefin polymerization reaction, an olefin polymer with low molecular weight can be provided. Therefore, the supported hybrid catalyst including the first and second transition metal compounds can provide an olefin polymer having a broad molecular weight distribution.

Specifically, $Cp_1$ and $Cp_2$ of Chemical Formula 2 may be cyclopentadienyl groups. The second transition metal compound, where $Cp_1$ and $Cp_2$ are cyclopentadienyl groups and the cyclopentadienyl groups are not bridged, exhibits low comonomer incorporation to the alpha-olefin during olefin polymerization, and predominantly produces olefin polymers with low molecular weight. Therefore, when the second transition metal compound is supported on the same support as the first transition metal compound of Chemical Formula 1 and then used, physical properties of the desired olefin polymer can be more easily realized by controlling the molecular weight distribution of the olefin polymer, the distribution of the monomer copolymerized in the olefin polymer chain, and the copolymerization properties of the olefin.

The $Cp_1$ may be substituted with 1 to 5 of $R_7$, and the $Cp_2$ may be substituted with 1 to 5 of $R_8$. When u is an integer of 2 or more in Chemical Formula 2, a plurality of $R_7$ may be the same as or different from each other. When v is an integer of 2 or more in Chemical Formula 2, a plurality of $R_8$ may be the same as or different from each other.

These $R_7$ and $R_8$ may be the same as or different from each other, and each is independently hydrogen or a C1 to C20 alkyl group. The second transition metal compound in which $R_7$ and $R_8$ have the substituent as described above may have excellent support stability.

Further, $X_3$ and $X_4$ of Chemical Formula 2 may be the same as or different from each other, and each is independently a halogen. In the second transition metal compound where $X_3$ and $X_4$ have the substituent as described above, the halogen group can be easily substituted with an alkyl group by reacting with alkyl metal or methylaluminoxane, which is a cocatalyst. In addition, by the subsequent alkyl abstraction, the second transition metal compound forms an ionic intermediate with the cocatalyst to easily provide a cationic form, which is an active species of the olefin polymerization reaction.

The second transition metal compound may include a compound represented by the following Chemical Formula 5.

[Chemical Formula 5]

wherein, in Chemical Formula 5, $R_7$ and $R_8$ are the same as or different from each other, and are each independently a halogen or a C1 to C20 alkyl group, $M_2$ is Ti, Zr, or Hf, and $X_3$ and $X_4$ are the same as or different from each other, and are each independently a halogen.

More specifically, an example of the compound represented by the Chemical Formula 5 includes a compound represented by the following Chemical Formula 5-1.

[Chemical Formula 5-1]

The supported hybrid catalyst may include the first transition metal compound and the second transition metal compound in a molar ratio of 1:0.1 to 1:0.9, 1:0.2 to 1:0.8, or 1:0.3 to 1:0.5. Accordingly, the molecular weight distribution of the olefin polymer, the distribution of the monomer copolymerized in the polymer chain, and the copolymerization properties of the olefin can be easily controlled to realize the desired physical properties.

A support having a hydroxyl group or a siloxane group on its surface can be used. Specifically, the support may have both the highly reactive hydroxyl group and the siloxane group, which is dried at a high temperature and moisture is removed from the surface. For example, silica, alumina, magnesia, or a mixture thereof can be used. The support may be dried at a high temperature, and may contain oxides, carbonates, sulfates, or nitrates such as $Na_2O$, $K_2CO_3$, $BaSO_4$, $Mg(NO_3)_2$, and the like.

The supported hybrid catalyst may further include a cocatalyst to activate transition metal compounds which are catalyst precursors. As the cocatalyst, those conventionally used in the art can be applied without particular limitation. For example, the cocatalyst may be at least one compound selected from the group consisting of compounds represented by the following Chemical Formulae 6 to 8.

The supported hybrid catalyst may further include at least one cocatalyst selected from the group consisting of compounds represented by the following Chemical Formulae 6 to 8.

—[Al($R_9$)—O]$_m$—      [Chemical Formula 6]

In Chemical Formula 6, $R_9$ are the same as or different from each other, and each is independently a halogen, a C1 to C20 alkyl group, or a C1 to C20 alkyl group substituted with a halogen, and m is an integer of 2 or more.

J($R_{10}$)$_3$      [Chemical Formula 7]

In Chemical Formula 7, $R_{10}$ are the same as or different from each other, and each is independently a halogen, a C1 to C20 alkyl group, or a C1 to C20 alkyl group substituted with a halogen, and J is aluminum or boron.

[E-H]$^+$[$ZA_4$]$^-$ or [E]$^+$[$ZA_4$]$^-$      [Chemical Formula 8]

In Chemical Formula 8, E is a neutral or cationic Lewis base, H is a hydrogen atom, Z is a Group 13 element, and A are the same as or different from each other, and each is independently a C6 to C20 aryl or C1 to C20 alkyl group, of which one or more hydrogen atoms are substituted or unsubstituted with a halogen, a C1 to C20 alkyl group, an alkoxy, or a phenoxy.

Examples of the compound represented by Chemical Formula 6 may include methylaluminoxane, ethylaluminoxane, iso-butylaluminoxane, tert-butylaluminoxane, and the like. Examples of the compound represented by Chemical Formula 7 may include trimethylaluminum, triethylaluminum, triisobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, and the like. Examples of the compound represented by Chemical Formula 8 may include trimethylammonium tetrakis (pentafluorophenyl) borate, triethylammonium tetrakis (pentafluorophenyl) borate, N,N-dimethylanilinium tetrakis (pentafluorophenyl) borate, N,N-dimethylanilinium n-butyltris (pentafluorophenyl) borate, N,N-dimethylanilinium benzyltris (pentafluorophenyl) borate, N,N-dimethylanilinium tetrakis (4-(t-butyldimethylsilyl)-2,3,5,6-tetrafluorophenyl) borate, N,N-dimethylanilinium tetrakis (4-(triisopropylsilyl)-2,3,5,6-tetrafluorophenyl) borate, N,N-dimethylanilinium pentafluorophenoxy tris (pentafluorophenyl) borate, N,N-dimethyl-2,4,6-trimethylanilinium tetrakis (pentafluorophenyl) borate, trimethylammonium tetrakis (2,3,4,6-tetrafluorophenyl) borate, N,N-dimethylanilinium tetrakis (2,3,4,6-tetrafluorophenyl) borate, hexadecyl dimethyl ammonium tetrakis (pentafluorophenyl) borate, N-methyl-N-dodecyl anilinium tetrakis (pentafluorophenyl) borate, methyldi(dodecyl) ammonium tetrakis (pentafluorophenyl) borate, and the like.

This supported hybrid metallocene catalyst may be prepared, for example, by using a method including the steps of: supporting a cocatalyst on a support; and supporting a first transition metal compound and a second transition metal compound, which are catalyst precursors, on the cocatalyst-supported support.

Specifically, in the step of supporting a cocatalyst on a support, the support which is dried at a high temperature and the cocatalyst may be mixed and stirred at a temperature of about 20° C. to 120° C. to prepare a cocatalyst-supported support.

Subsequently, in the step of supporting the catalyst precursors on the cocatalyst-supported support, the first transition metal compound is added to the cocatalyst-supported support and stirred at a temperature of about 20° C. to 120° C., and then the second transition metal compound is added thereto and stirred at a temperature of about 20° C. to 120° C. to prepare a supported hybrid catalyst.

In the step of supporting the catalyst precursors on the cocatalyst-supported support, the catalyst precursors is added to the cocatalyst-supported support, followed by stirring, and then the cocatalyst may be further added thereto to prepare a supported hybrid catalyst.

The content of the support, cocatalyst, cocatalyst-supported support, and first and second transition metal compounds used for preparing the supported hybrid catalyst may be appropriately adjusted depending on physical properties or effects of the desired supported hybrid catalyst.

In the preparation of the supported hybrid catalyst, a reaction solvent may be used, and examples thereof include hydrocarbon solvents such as pentane, hexane, and heptane, and aromatic solvents such as benzene and toluene.

A more detailed preparation method of the supported hybrid catalyst can be referred to the following examples. However, the preparation method of the supported hybrid catalyst is not limited to this description. The preparation method may further include a step which is usually carried out in the technical field of the present invention, and the step(s) of the preparation method may be changed by the usually changeable step(s).

Examples of the olefinic monomers include ethylene, alpha-olefin, and cyclic olefin. A diene olefin-based monomer or a triene olefin-based monomer having two or more double bonds can be also polymerized Specific examples thereof include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenylnorbornene, vinyl norbornene, dicyclopentadiene, 1,4-butadiene, 1,5-pentadiene, 1,6-hexadiene, styrene, alpha-methylstyrene, divinylbenzene, and 3-chloromethylstyrene. Two or more of these monomers may be mixed and copolymerized. When the olefin polymer is a copolymer of ethylene and another comonomer, the comonomer is preferably at least one selected from the group consisting of propylene, 1-butene, 1-hexene, 4-methyl-1-pentene, and 1-octene.

For the polymerization of olefinic monomers, various polymerization processes known for the polymerization of olefinic monomers such as a continuous solution polymerization process, a bulk polymerization process, a suspension polymerization process, a slurry polymerization process, or an emulsion polymerization process may be applied.

Specifically, the polymerization reaction may be carried out at a temperature of about 50° C. to 110° C. or about 60° C. to 100° C., and a pressure of about 1 kgf/cm² to 100 kgf/cm² or about 1 kgf/cm² to 50 kgf/cm².

In the polymerization reaction, the supported hybrid catalyst may be used in a dissolved or diluted form in a solvent such as pentane, hexane, heptane, nonane, decane, toluene, benzene, dichloromethane, chlorobenzene, and the like. Herein, the solvent may be treated with a small amount of alkylaluminum to remove a small amount of water, air, or the like which can adversely affect the catalyst.

According to another embodiment of the present disclosure, a film including the olefin polymer of the embodiment can be provided. The film can be prepared by applying various molding methods, conditions, and devices known in the art without limitation.

In the film of another embodiment, the olefin polymer may include all of the above-mentioned descriptions in one embodiment.

The film may have a drop impact strength of 1500 g to 2400 g, 1550 g to 2200 g, 1580 g to 2000 g, or 1590 g to 1700 g, when molded into a film having a size of 5 cm×5 cm×100 μm (width×length×thickness) and measured in accordance with ASTM D1709A.

Further, the film may have haze of 10% to 30%, 15% to 30%, 20% to 30%, 25% to 30%, or 26.3% to 27.8%, when molded into a film having a thickness of 0.05 mm and measured in accordance with ASTM D1003.

The drop impact strength and haze may also include all of the above-mentioned descriptions in one embodiment.

EXEMPLARY EMBODIMENTS

The present invention will be described in more detail with reference to the following examples. However, these examples are for illustrative purposes only, and the invention is not intended to be limited by these examples.

PREPARATION EXAMPLES AND COMPARATIVE PREPARATION EXAMPLES

Preparation Example 1: Preparation of Transition Metal Compound (1) Synthesis of Ligand A 3,4-dimethyl-1H-indene as shown in the above structural formula was used as ligand A.

(2) Synthesis of Ligand B 13 mL (120 mmol) of t-butylamine and 20 mL of an ether solvent were placed in a 250 mL Schlenk flask. Then, 16 g (60 mmol) of (6-tert-butoxyhexyl) dichloro (methyl) silane and 40 mL of an ether solvent were added to a 250 mL different Schlenk flask from the above flask to obtain a t-butylamine solution and a (6-tert-butoxyhexyl) dichloro (methyl) silane solution, respectively. Thereafter, the t-butylamine solution was cooled down to −78° C., and the (6-tert-butoxyhexyl) dichloro (methyl) silane solution was slowly added thereto, followed by stirring at room temperature for about 2 hours. The resultant white suspension was filtered to obtain an ivory-colored liquid of 1-(6-(tert-butoxy)hexyl)-N-(tert-butyl)-1-chloro-methylsilaneamine) (ligand B).

$^1$H NMR (CDCl$_3$): 3.29 (t, 2H), 1.52-1.29 (m, 10H), 1.20 (s, 9H), 1.16 (s, 9H), 0.40 (s, 3H)

(3) Cross-Linking of Ligands A and B

1.7 g (8.6 mmol) of 3,4-dimethyl-1H-indene (ligand A) was added to a 250 mL Schlenk flask and 30 mL of THF was added thereto to prepare a ligand A solution. After cooling the ligand A solution to −78° C., 3.6 mL (9.1 mmol, 2.5 M in hexane) of an n-BuLi solution was added to the ligand A solution and stirred overnight at room temperature to obtain a purple-brown solution. The solvent of the purple-brown solution was replaced with toluene, and a solution of 39 mg (0.43 mmol) of CuCN dispersed in 2 mL of THF was added to this solution to prepare a solution A.

Meanwhile, a solution B prepared by adding 1-(6-(tert-butoxy) hexyl)-N-(tert-butyl)-1-chloro-1-methylsilanamine (ligand B) and toluene into a 250 mL Schlenk flask was cooled down to −78° C. Then, the solution A prepared before the cooled solution B was slowly injected. The mixture of solutions A and B was stirred at room temperature overnight. The resulting solid was removed by filtration to obtain 4.2 g (>99% yield) of a brown-colored viscous liquid of 1-(6-(tert-butoxy)hexyl)-N-(tert-butyl)-1-(3,4-dimethyl-1H-inden-3-yl)-1-methylsilanamine (a cross-linked product of ligands A and B).

(4) Synthesis of Transition Metal Compound 4.2 g of 1-(6-(tert-butoxy)hexyl)-N-(tert-butyl)-1-(3,4-dimethyl-1H-inden-3-yl)-1-methylsilanamine (a cross-linked product of ligands A and B) was added to a 250 mL Schlenk flask, and 14 mL of toluene and 1.7 mL of n-hexane were added thereto to dissolve the cross-linked product. After cooling down the solution to −78° C., 7.3 mL (18 mmol, 2.5 M in hexane) of an n-BuLi solution was injected into the cooled solution. Thereafter, the solution was stirred at room temperature for about 12 hours. Then, 5.3 ml (38 mmol) of trimethylamine was added to the solution, followed by stirring at about 40° C. for about 3 hours to prepare a solution C.

Meanwhile, 2.3 g (8.6 mmol) of TiCl$_4$(THF)$_2$ and 10 mL of toluene were added to a separately prepared 250 mL Schlenk flask to prepare a solution D in which TiCl$_4$(THF)$_2$ was dispersed in toluene. The solution C prepared before the solution D was slowly added at −78° C., and the mixture of solutions C and D was stirred at room temperature for about 12 hours. Thereafter, the solvent was removed under reduced pressure from the solution, and the obtained solute was dissolved in toluene. The solids not dissolved in toluene were removed by filtration, and the solvent was removed from the filtered solution to obtain 4.2 g (83% yield) of a transition metal compound in the form of a brown solid.

Preparation Example 2: Preparation of Transition Metal Compound

A transition metal compound with the following structure was prepared in the same manner as in Preparation Example 1, except that 4-methyl-1H-indene was used instead of 3,4-dimethyl-1H-indene as ligand A in step (1) of Preparation Example 1.

Preparation Example 3: Preparation of Transition Metal Compound

A transition metal compound with the following structure was prepared in the same manner as in Preparation Example 1, except that 3-methyl-1H-indene was used instead of 3,4-dimethyl-1H-indene as ligand A in step (1) of Preparation Example 1.

Comparative Preparation Example 1: Preparation of Transition Metal Compound t-butoxyhexylmethylsilyl (N-t-butylamido) (2,3,4,5-tetramethylcyclopentadienyl)-titanium dichloride of the following structure was prepared.

Comparative Preparation Example 2: Preparation of Transition Metal Compound A transition metal compound with the following structure was prepared in the same manner as in Preparation Example 1, except that 1,2-dimethyl-3H-benzo[b]cyclopenta[d]thiophene was used instead of 3,4-dimethyl-1H-indene as ligand A in step (1) of Preparation Example 1.

Comparative Preparation Example 3: Preparation of Transition Metal Compound

A transition metal compound with the following structure was prepared in the same manner as in Preparation Example 1, except that 1H-indene was used instead of 3,4-dimethyl-1H-indene as ligand A in step (1) of Preparation Example 1.

EXAMPLES AND COMPARATIVE EXAMPLES

Example 1: Preparation of Supported Hybrid Catalyst and Preparation of Olefin Polymer Using the Same (1) Preparation of Supported Hybrid Catalyst 100 mL of toluene was placed in a 300 mL glass reactor, and 7 g of silica (Grace Davison, SP952) was added thereto at a reactor temperature of 40° C., followed by stirring. Thereafter, 5.3 mL of a 10 wt % methylaluminoxane (MAO)/toluene solution (manufactured by Albemarle) was added thereto, and the mixture was stirred for 2 hours while being heated to 95° C. Then, the temperature of the reactor was lowered to 40° C., stirring was stopped, settling was performed for 10 minutes, and the reaction solution was decanted. Thereafter, 100 mL of toluene was added thereto and stirred for 10 minutes. Subsequently, stirring was stopped, settling was performed for 10 minutes, and the toluene solution was decanted. Thereafter, 50 mL of toluene was added to the reactor. 0.30 g of the transition metal compound of Preparation Example 1 as the first transition metal compound and bis(n-butylcyclopentadienyl)-zirconium dichloride as the second transition metal compound were mixed in a glove box at a molar ratio of 1:0.45, and then dissolved in 25 ml of toluene. This was transferred to the reactor, and stirred at 80° C. and 500 rpm for 2 hours. Thereafter, stirring was stopped, settling was performed for 10 minutes, and the reaction solution was decanted. Then, 50 mL of toluene was added to the reactor. After the reactor temperature was lowered to room temperature, stirring was stopped, settling was performed for 10 minutes, and the reaction solution was decanted. Then, 100 mL of hexane was added to the reactor, and 0.05 mmol of acrylonitrile styrene acrylate (ASA) was added thereto. After stirring for 10 minutes, the hexane slurry was transferred to a 250 mL Schlenk flask, and the hexane solution was decanted. Thereafter, drying was performed at room temperature under reduced pressure for 3 hours to obtain a supported hybrid catalyst.

(2) Preparation of Olefin Polymer

For the preparation of the olefin polymer, a 600 mL metal-alloy high pressure reactor equipped with a mechanical stirrer and a temperature controller was prepared.

On the other hand, the supported hybrid catalyst prepared in step (1) of Example 1 was quantitatively measured in a dry box and placed in a 50 mL glass bottle, and then the inlet of the glass bottle was sealed with a rubber diaphragm.

Then, 400 mL of hexane containing 1.0 mmol of triethylaluminum and the previously prepared supported hybrid catalyst were added into the 600 mL metal-alloy reactor without air contact. Then, the reactor temperature was raised to about 80° C., ethylene was injected into the reactor, and ethylene was polymerized for about 1 hour. At this time, the ethylene gas was continuously injected so that the reactor pressure was maintained at about 30 kgf/cm$^2$.

Thereafter, when the ethylene was polymerized to a desired level, stirring of the reactor was stopped, and unreacted ethylene gas was removed by evacuation. Then, the solvent was removed from the reaction product, and the obtained solid was dried in a vacuum oven at about 80° C. for about 4 hours to obtain an ethylene homopolymer.

Example 2: Preparation of Supported Hybrid Catalyst and Preparation of Olefin Polymer Using the Same A supported hybrid catalyst was prepared in the same manner as in Example 1, except that the transition metal compound prepared in Preparation Example 2 was used as the first transition metal compound in Example 1. Subsequently, an ethylene homopolymer was obtained in the same manner as in Example 1, using the supported hybrid catalyst.

Example 3: Preparation of Supported Hybrid Catalyst and Preparation of Olefin Polymer Using the Same A supported hybrid catalyst was prepared in the same manner as in Example 1, except that the transition metal compound prepared in Preparation Example 3 was used as the first transition metal compound in Example 1. Then, an ethylene homopolymer was obtained in the same manner as in Example 1, using the supported hybrid catalyst.

Comparative Example 1: Preparation of Supported Hybrid Catalyst and Preparation of Olefin Polymer Using the Same A supported hybrid catalyst was prepared in the same manner as in Example 1, except that the transition metal compound prepared in Comparative Preparation Example 1 was used as the first transition metal compound in Example 1. Subsequently, an ethylene homopolymer was obtained in the same manner as in Example 1, using the supported hybrid catalyst.

Comparative Example 2: Preparation of Supported Hybrid Catalyst and Preparation of Olefin Polymer Using the Same A supported hybrid catalyst was prepared in the same manner as in Example 1, except that the transition metal compound prepared in Comparative Preparation Example 2 was used as the first transition metal compound in Example 1. Subsequently, an ethylene homopolymer was obtained in the same manner as in Example 1, using the supported hybrid catalyst.

Comparative Example 3: Preparation of Supported Hybrid Catalyst and Preparation of Olefin Polymer Using the Same A supported hybrid catalyst was prepared in the same manner as in Example 1, except that the transition metal compound prepared in Comparative Preparation Example 3 was used as the first transition metal compound in Example 1. Subsequently, an ethylene homopolymer was obtained in the same manner as in Example 1, using the supported hybrid catalyst.

EXPERIMENTAL EXAMPLES

Experimental Example 1: Measurement of Physical Properties of Olefin Polymer Physical properties of the ethylene homopolymers prepared in Examples 1 to 3 and Comparative Examples 1 to 3 were measured, and the results are shown in Table 1 below.

(1) Melt Index (MI, unit: g/10 min): The melt index was measured according to ASTM D1238 at 230° C. under a load of 2.16 kg and expressed as the weight (g) of the polymer melted for 10 minutes.

(2) Density (unit: g/cm$^3$): The density was measured according to ASTM D1505.

(3) Weight average molecular weight (Mw) and molecular weight distribution (polydispersity index, PDI): The weight average molecular weight (Mw) and the number average molecular weight (Mn) of the polymer were measured using Gel Permeation Chromatography (GPC), and the molecular weight distribution (PDI) was calculated by dividing the weight average molecular weight by the number average molecular weight.

Herein, the measuring instrument and measurement conditions of the gel permeation chromatography are as follows.

A Polymer Laboratories PLgel MIX-B 300 mm long column and PL-GPC220 instrument manufactured by Waters were used at an evaluation temperature of 160° C. 1,2,4-trichlorobenzene was used for a solvent and flow rate was 1 mL/min. The sample was prepared at a concentration of 10 mg/10 mL, and then supplied in an amount of 200 μL. Mw, Mn, and PDI can be obtained using a calibration curve formed using a polystyrene standard. The molecular weight of the polystyrene standard was 2000/10,000/30,000/70,000/200,000/700,000/2,000,000/4,000,000/10,000,000.

(4) The average number of SCB (Short Chain Branch; C2 to C7 branches per 1000 carbon atoms; unit: ea/1000C)

A molecular weight distribution curve was obtained by plotting a log value of molecular weight M measured by GPC (log M) on an x-axis and molecular weight distribution with respect to the log value (dwt/dlog M) on a y-axis using Gel Permeation Chromatography (GPC). This was expressed as a continuous solid line in FIG. 1 and FIG. 2.

An SCB distribution curve was obtained by plotting the log value of molecular weight M measured by GPC (log M) on the x-axis and the number of C2 to C7 branches per 1000 carbon atoms measured by FT-IR with respect to the log value on the y-axis. This was expressed as a discontinuous dotted line in FIG. 1 and FIG. 2.

Figure 2:
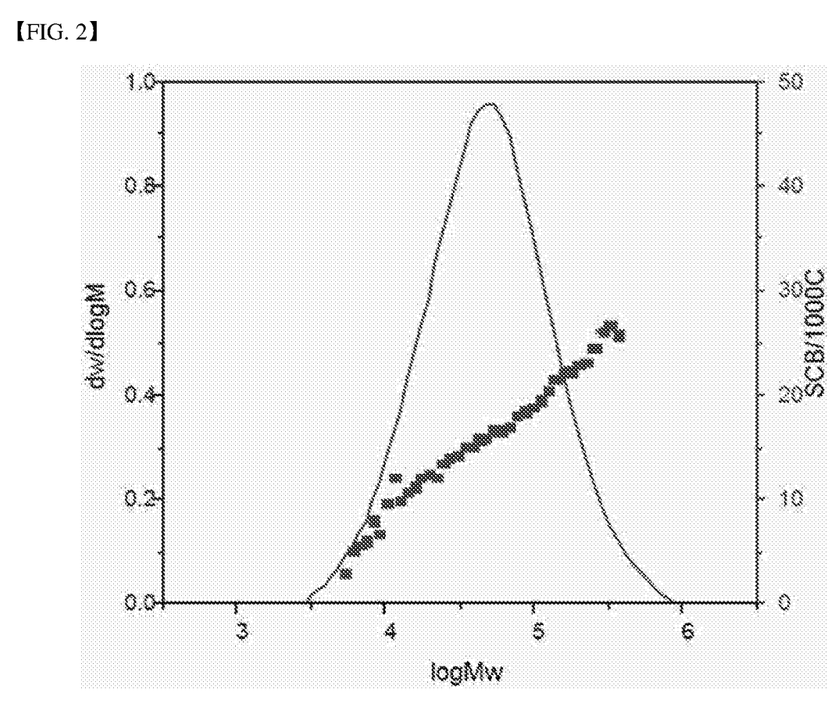
FIG. 2 shows a molecular weight distribution curve (solid line) and a SCB distribution curve (dotted line) of the olefin polymer of Comparative Example 1.

Then, the average number of C2 to C7 branches per 1000 carbon atoms contained in each of a plurality of polymer chains in the olefin polymer was calculated using the SCB distribution curve. This is shown in Table 1 below.

According to a general calculation method for average value, the average number was derived by dividing the total number of C2 to C7 branches per 1000 carbon atoms contained in each of a plurality of polymer chains in the olefin polymer by the number of polymer chains.

Herein, the measuring instrument and measurement conditions of the gel permeation chromatography are the same as those described above in (3) Weight average molecular weight (Mw) and molecular weight distribution, and the FT-IR measuring instrument and measurement conditions are as follows.

<Measuring Instrument>
FT-IR (Bio-Rad FTS 3000, Bio Rad) with Golden Gate Single Reflection ATR system
<Measurement Conditions>
Wavenumber: 2700 cm$^{-1}$ to 3000 cm$^{-1}$
Number of scans: 16
Resolution: 8 cm$^{-1}$
Detector: DTGS

TABLE 1

Measurement results of Experimental Example 1

|  | MI [g/10 min] | Density [g/cm$^3$] | Mw [g/mol] | PDI | Average number of SCB [per 1000 C] |
|---|---|---|---|---|---|
| Example 1 | 0.86 | 0.920 | 113,000 | 8.9 | 21.7 |
| Example 2 | 0.90 | 0.918 | 120,000 | 9.2 | 20.5 |
| Example 3 | 0.92 | 0.919 | 132,000 | 9.6 | 20.6 |

TABLE 1-continued

Measurement results of Experimental Example 1

|  | MI [g/10 min] | Density [g/cm³] | Mw [g/mol] | PDI | Average number of SCB [per 1000 C] |
|---|---|---|---|---|---|
| Comparative Example 1 | 1.04 | 0.918 | 124,000 | 2.7 | 16.4 |
| Comparative Example 2 | 0.94 | 0.918 | 116,000 | 3.5 | 15.3 |
| Comparative Example 3 | 0.96 | 0.918 | 136,000 | 2.4 | 14.7 |

As shown in Table 1, the olefin polymers obtained in the examples had low melt indexes (MI) of 0.86 g/10 min to 0.92 g/10 min, broad molecular weight distribution (PDI) of 8.9 to 9.6, and a high average number of SCB of 20.5/1000C to 21.7/1000C.

On the other hand, the olefin polymers of the comparative examples obtained by the supported hybrid catalyst using the transition metal compound different from the examples had higher melt indexes (MI) of 0.94 g/10 min to 1.04 g/10 min, narrower molecular weight distribution (PDI) of 2.4 to 3.5, and a smaller average number of SCB of 14.7/1000C to 16.4/1000C than those of the examples.

Experimental Example 2: Measurement of Physical Properties of Film

The olefin polymers of Examples 1 to 3 and Comparative Examples 1 to 3 were granulated with a twin screw extruder after treating with an antioxidant (Irganox 1010+Irgafos 168, manufactured by CIBA), and then inflated to a thickness of 0.05 mm at an extrusion temperature of 165 to 200° C. using a single screw extruder (Shinhwa Industrial Co., Ltd. Single Screw Extruder, Blown Film M/C, 50 mm, L/D=20) to form a film. Herein, the die gap was 2.0 mm and an expansion ratio was 2.3.

(1) Haze: It was measured in accordance with ASTM D 1003, after molding a film having a thickness of 0.05 mm. Herein, the haze was measured 10 times per specimen and the average value was listed.

(2) Drop impact strength: The film was cut to a size of 5 cm×5 cm×100 μm (width×length×thickness) to prepare a specimen. Thereafter, the specimen was placed in a drop impact tester under the conditions of ASTM D1709A, and a weight having a diameter of 38 mm was freely dropped at a height of 0.66 m to measure the drop impact strength.

TABLE 2

The measurement results of Experimental Example 2

|  | Haze (%) | Drop impact strength (g) |
|---|---|---|
| Example 1 | 27.8 | 1670 |
| Example 2 | 26.9 | 1620 |
| Example 3 | 26.3 | 1590 |
| Comparative Example 1 | 23.0 | 1050 |
| Comparative Example 2 | 26.3 | 900 |
| Comparative Example 3 | 26.0 | 850 |

As shown in Table 2, the films obtained in the examples had haze of 26.3% to 27.8% and high drop impact strength of 1590 g to 1670 g.

On the other hand, the films obtained in the comparative examples had haze of 23.0% to 26.3%, which is comparable to that of the examples. However, the films of the comparative examples exhibited low drop impact strength of 850 g to 1050 g, which is lower than that of the examples.

The invention claimed is:

1. An olefin polymer having a plurality of polymer chains, and satisfying the following conditions i) to iii):
    i) each polymer chain of the plurality has an average number of short chain branches (SCBs) per 1000 carbon atoms of 20/1000C or more, wherein an SCB has C2 to C7 carbon atoms;
    ii) a molded film of the olefin polymer has a drop impact strength of 1500 g to 2400 g as measured in accordance with ASTM D1709A, wherein the molded film has a thickness of 100 μm; and
    iii) a molded film of the olefin polymer has a haze of 10% to 30% as measured in accordance with ASTM D1003, wherein the molded film has a thickness of 0.05 mm.

2. The olefin polymer of claim 1, wherein the plurality of polymer chains have a range of molecular weight values defined between 0 and 1, wherein a minimum value of molecular weight in a polymer chain in the plurality is defined as 0, wherein the weight average molecular weight (Mw) of the olefin polymer is defined as 0.5, and a maximum value of a molecular weight in a polymer chain in the plurality is defined as 1, and
wherein
a maximum value for a number of SCBs per 1000 carbon atoms is found in polymer chains in the plurality having molecular weights defined between 0.8 to 1.0.

3. The olefin polymer of claim 1, wherein the plurality of polymer chains have a range of molecular weight values defined between 0 and 1, wherein a minimum value of molecular weight in a polymer chain in the plurality is defined as 0, wherein the weight average molecular weight (Mw) of the olefin polymer is defined as 0.5, and a maximum value of a molecular weight in a polymer chain in the plurality is defined as 1, and wherein a minimum value for a number of SCBs per 1000 carbon atoms is found in polymer chains having molecular weights defined between 0 to 0.2.

4. The olefin polymer of claim 1, wherein the olefin polymer has a molecular weight distribution (Mw/Mn) of 5 to 10.

5. The olefin polymer of claim 1, wherein the olefin polymer has a melt index of 0.80 g/10 min to 0.93 g/10 min, wherein the melt index is measured at 230° C. with a load of 2.16 kg in accordance with ASTM D1238.

6. The olefin polymer of claim 1, wherein the olefin polymer has a density of 0.910 g/cm³ to 0.930 g/cm³ as measured by ASTM 1505.

7. The olefin polymer of claim 1, wherein the olefin polymer has a weight average molecular weight (Mw) of 100,000 g/mol to 150,000 g/mol.

8. A preparation method of the olefin polymer of claim 1, comprising the step of polymerizing olefinic monomers in the presence of a supported hybrid catalyst comprising a first transition metal compound represented by the following Chemical Formula 1, a second transition metal compound represented by the following Chemical Formula 2, and a support on which the first and second transition metal compounds are supported:

[Chemical Formula 1]

[Chemical Formula 2]

[Cp$_1$(R$_7$)$_u$][Cp$_2$(R$_8$)$_v$]M$_2$X$_3$X$_4$ wherein, in Chemical Formulae 1 and 2, C$_1$ is a ligand represented by the following Chemical Formula 3,

[Chemical Formula 3]

where R$_1$ and R$_2$ are the same as or different from each other, and at least one of R$_1$ and R$_2$ is a C1 to C20 alkyl group and the other is hydrogen;

Z is —O—, —S—, —NR$_3$—, or —PR$_4$—, where R$_3$ and R$_4$ are the same as or different from each other, and are each independently a halogen or a C1 to C20 alkyl group;

M$_1$ and M$_2$ are the same as or different from each other, and are each independently Ti, Zr, or Hf;

X$_1$ to X$_4$ are the same as or different from each other, and are each independently a halogen;

T is where T$_1$ is C, Si, Ge, Sn, or Pb,

Y$_1$ is a C1 to C20 alkoxyalkyl group, and

Y$_2$ is a C1 to C20 alkyl group;

Cp$_1$ and Cp$_2$ are cyclopentadienyl groups;

R$_7$ and R$_8$ are the same as or different from each other, and are each independently a halogen or a C1 to C20 alkyl group; and u and v are each independently an integer of 0 to 5.

9. The preparation method of claim 8, wherein the first transition metal compound is a compound represented by the following Chemical Formula 4:

[Chemical Formula 4]

wherein, in Chemical Formula 4, R$_1$ and R$_2$ are the same as or different from each other, and at least one of R$_1$ and R$_2$ is a C1 to C20 alkyl group and the other is hydrogen, R$_3$ is a C1 to C10 alkyl group, M$_1$ is Ti, Zr, or Hf, X$_1$ and X$_2$ are the same as or different from each other, and are each independently a halogen,

T$_1$ is C or Si,

Y$_1$ is a C1 to C20 alkoxyalkyl group, and

Y$_2$ is a C1 to C20 alkyl group.

10. The preparation method of claim 8, wherein the second transition metal compound is a compound represented by the following Chemical Formula 5:

[Chemical Formula 5]

wherein, in Chemical Formula 5, R$_7$ and R$_8$ are the same as or different from each other, and are each independently a halogen or a C1 to C20 alkyl group, M$_2$ is Ti, Zr, or Hf, and X$_3$ and X$_4$ are the same as or different from each other, and are each independently a halogen.

11. The preparation method of claim 8, wherein the first transition metal compound and the second transition metal compound are contained in a molar ratio of 1:0.1 to 1:0.9.

12. The preparation method of claim 8, wherein the support is silica, alumina, magnesia, or a mixture thereof.

13. The preparation method of claim 8, wherein the supported hybrid catalyst further comprises at least one cocatalyst selected from the group consisting of compounds represented by the following Chemical Formulae 6 to 8:

—[Al(R$_9$)—O]$_m$—      [Chemical Formula 6]

wherein, in Chemical Formula 6,

R$_9$ are the same as or different from each other, and each is independently a halogen, a C1 to C20 alkyl group, or a C1 to C20 alkyl group substituted with a halogen, and m is an integer of 2 or more, J(R$_{10}$)$_3$      [Chemical Formula 7]

wherein, in Chemical Formula 7, $R_{10}$ are the same as or different from each other, and each is independently a halogen, a C1 to C20 alkyl group, or a C1 to C20 alkyl group substituted with a halogen, and J is aluminum or boron, $$[E-H]^+[ZA_4]^- \text{ or } [E]^+[ZA_4]^- \quad \text{[Chemical Formula 8]}$$

wherein, in Chemical Formula 8,

E is a neutral or cationic Lewis base,

H is a hydrogen atom,

Z is a Group 13 element, and

A are the same as or different from each other, and each is independently a C6 to C20 aryl or C1 to C20 alkyl group, of which one or more hydrogen atoms are substituted or unsubstituted with a halogen, a C1 to C20 alkyl group, an alkoxy, or a phenoxy.

14. The preparation method of claim 8,
wherein the olefinic monomers comprise at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenylnorbornene, vinyl norbornene, dicyclopentadiene, 1,4-butadiene, 1,5-pentadiene, 1,6-hexadiene, styrene, alpha-methylstyrene, divinylbenzene, and 3-chloromethylstyrene.

15. A film comprising the olefin polymer of claim 1.

* * * * *